US012594514B2

(12) United States Patent
Lee et al.

(10) Patent No.: US 12,594,514 B2
(45) Date of Patent: Apr. 7, 2026

(54) NANOFIBER FOR AIR FILTER COMPRISING RANDOM COPOLYMER HAVING ZWITTERIONIC FUNCTIONAL GROUP AND METHOD FOR MANUFACTURING SAME

(71) Applicant: Gwangju Institute of Science and Technology, Gwangju (KR)

(72) Inventors: Jae Suk Lee, Gwangju (KR); Santosh Kumar, Gwangju (KR); Byung Ju Jung, Gwangju (KR); Hye Min Oh, Gwangju (KR); Yo Seph Jang, Gwangju (KR)

(73) Assignee: Gwangju Institute of Science and Technology, Gwangju (KR)

(*) Notice: Subject to any disclaimer, the term of this patent is extended or adjusted under 35 U.S.C. 154(b) by 738 days.

(21) Appl. No.: 17/933,826

(22) Filed: Sep. 20, 2022

(65) Prior Publication Data

US 2023/0059080 A1 Feb. 23, 2023

Related U.S. Application Data

(63) Continuation of application No. PCT/KR2020/010474, filed on Aug. 7, 2020.

(30) Foreign Application Priority Data

Mar. 20, 2020 (KR) ........................ 10-2020-0034397

(51) Int. Cl.
*B01D 39/16* (2006.01)
*C08F 220/46* (2006.01)
(Continued)

(52) U.S. Cl.
CPC ........ *B01D 39/1623* (2013.01); *C08F 220/46* (2013.01); *D01D 5/003* (2013.01);
(Continued)

(58) Field of Classification Search
CPC ..... D01F 1/00; D01F 1/02; D01F 1/10; D01F 6/00; D01F 6/28; D01F 6/58;
(Continued)

(56) References Cited

U.S. PATENT DOCUMENTS

2017/0107332 A1* 4/2017 Van Der Huizen ........ C08J 5/18
2018/0133656 A1 5/2018 Asatekin et al.

FOREIGN PATENT DOCUMENTS

EP 2318451 B1 * 7/2019 ............. B01D 71/82
JP 2011-137066 A 7/2011
(Continued)

OTHER PUBLICATIONS

International Search Report mailed Dec. 17, 20202 in International Application No. PCT/KR2020/010474.
(Continued)

*Primary Examiner* — Allison G Fitzsimmons
(74) *Attorney, Agent, or Firm* — Knobbe, Martens, Olson & Bear, LLP

(57) ABSTRACT

A nanofiber for an air filter and a method for manufacturing the same are proposed. The nanofiber may include a styrene-(meth)acrylate-acrylonitrile random copolymer having a zwitterionic functional group in a side chain. The nanofiber can greatly enhance the bonding of particulate matter (PM) particles with the surface of a polymer by having a high dipole moment derived from the zwitterionic functional group, thereby providing high efficiency of filtration (>99.9%) of the PM particles. Furthermore, the nanofiber can be very usefully used as a core material for air purifier filters and vehicle air purification filters by having low airflow resistance and excellent antibacterial properties.

2 Claims, 9 Drawing Sheets

Polystyrene-co-poly 2-(dimethylamino)ethyl methacrylate-co-poly (acrylonitrile)

(51) Int. Cl.
*D01D 5/00* (2006.01)
*D01F 6/38* (2006.01)
*D01F 1/00* (2006.01)

(52) U.S. Cl.
CPC .......... *D01F 6/38* (2013.01); *B01D 2239/025* (2013.01); *D10B 2401/13* (2013.01); *D10B 2505/04* (2013.01)

(58) Field of Classification Search
CPC ......... D06M 2101/16; D06M 2101/18; D06M 2101/20; D06M 2101/26; D06M 2101/28
See application file for complete search history.

(56) References Cited

FOREIGN PATENT DOCUMENTS

| | | | | |
|---|---|---|---|---|
| KR | 10-2009-0082418 | A | 7/2009 | |
| KR | 10-1668395 | B1 | 10/2016 | |
| KR | 10-2018-0007817 | A | 1/2018 | |
| KR | 10-2018-0021238 | A | 2/2018 | |
| KR | 10-2019-0066635 | A | 6/2019 | |
| WO | WO-2013056312 | A1 * | 4/2013 | ........... D04H 1/4326 |

OTHER PUBLICATIONS

Office Action received in Korean Application No. 10-2020-0034397 dated Nov. 29, 2021.
Notice of Allowance received in Korean Application No. 10-2020-0034397 dated Feb. 17, 2022.

* cited by examiner styrene 2-(Dimethylamino)ethyl methacrylate acrylonitrile

ABC

Polystyrene-co-poly 2-(dimethylamino)ethyl methacrylate-co-poly (acrylonitrile)

ABC

Polystyrene-co-poly 2-(dimethylamino)ethyl methacrylate-co-poly (acrylonitrile)

Z-ABC

Zwitterionic[Polystyrene-co-poly 2-(dimethylamino)ethyl methacrylate-co-poly (acrylonitrile)]

Polystyrene-co-poly 2-(dimethylamino)ethyl methacrylate-co-poly (acrylonitrile)

Quaternary ammonium [Polystyrene-co-poly 2-(dimethylamino) ethyl methacrylate-co-poly (acrylonitrile)]

NANOFIBER FOR AIR FILTER COMPRISING RANDOM COPOLYMER HAVING ZWITTERIONIC FUNCTIONAL GROUP AND METHOD FOR MANUFACTURING SAME

CROSS-REFERENCE TO RELATED APPLICATIONS

This application is a continuation application, and claims the benefit under 35 U.S.C. § 120 and § 365 of PCT Application No. PCT/KR2020/010474 filed on. Aug. 7, 2020, which claims priority to Korean Application No. 10-2020-0034397 filed on Mar. 20, 2020, the contents of each of which are hereby incorporated by reference in its entirety.

BACKGROUND

Technical Field

The present disclosure relates to a nanofiber for use as a material for air filtration and a method for manufacturing the same.

Description of Related Technology

Various air pollutants can cause respiratory and cardiovascular diseases, asthma, vomiting, skin irritation, hypertension, cancer, and congenital defects. Due to such adverse effects on human health, interest in air pollution is increasing worldwide.

SUMMARY

One aspect is a nanofiber suitable as a material for an air filter material having high fine dust removal efficiency and low resistance to air flow, and a method of manufacturing the same.

Another aspect is an air filter nanofiber made of a styrene-(meth)acrylate-acrylonitrile random copolymer having a zwitterionic functional group in the side chain.

The styrene-(meth)acrylate-acrylonitrile random copolymer is a kind of thermoplastic elastomer including two hard parts (styrene and acrylonitrile) and one soft part ((meth) acrylate).

In the styrene-(meth)acrylate-acrylonitrile random copolymer, the styrene part and the acrylonitrile part are derived from common styrene-based monomers and acrylonitrile monomers, respectively. In particular, the (meth)acrylate part may be derived from (meth)acrylate monomers and can also be derived from substituted (meth)acrylate monomers.

Examples of the substituted (meth)acrylate monomer include (meth)acrylate amine-based monomers such as 2-(dimethylamino)ethyl methacrylate, diethylaminoethylacrylate, dimethylaminoethylacrylate, diethylaminoethylacrylate, etc.

For example, a styrene-(meth)acrylate-acrylonitrile random copolymer obtained by polymerizing 2-(dimethylamino)ethyl methacrylate, which is a (meth)acrylate-based amine-based monomer, with styrene and acrylonitrile is polystyrene-co-poly 2-(dimethylamino)ethyl methacrylate-co-poly(acrylonitrile).

As an example of such a random copolymer, a styrene-(meth)acrylate-acrylonitrile random copolymer obtained by polymerizing 2-(dimethylamino)ethyl methacrylate and n-butyl methacrylate with styrene and acrylonitrile is polystyrene-co-poly 2-(dimethylamino)ethyl methacrylate-co-poly(acrylonitrile)-co-poly(n-butyl methacrylate.

On the other hand, the zwitterionic functional group introduced into the styrene-(meth)acrylate-acrylonitrile random copolymer induces a high dipole moment in the copolymer to facilitating bonding of fine dust (PM) to the surface of the copolymer, thereby increasing the dust removal efficiency. An example of the zwitterionic functional group ($—RR'N^+(CH_2)_nSO^{3-}$) for this purpose is a sulfobetaine group including a sulfonate group and a quaternary ammonium group.

An example of the zwitterionic random copolymer obtained by introducing a sulfobetaine group as a zwitterionic functional group into the side chain of the styrene-(meth)acrylate-acrylonitrile random copolymer can be represented by Formula 1.

[Formula 1]

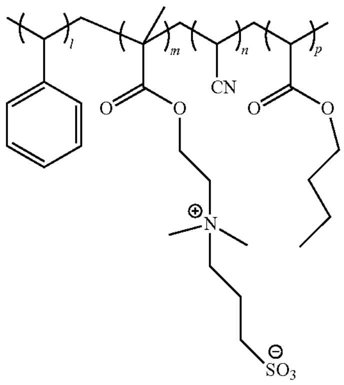

(In Formula 1, l is in a range of 1 to 1500, m is in a range of 1 to 1500, n is in a range of 1 to 2000, and p is in a range of 0 to 1500).

In addition, another example of the styrene-(meth)acrylate-acrylonitrile random copolymer having a zwitterionic functional group in the side chain is represented by Formula 2, and one examples of the styrene-(meth)acrylate-acrylonitrile random copolymer may be a random copolymer containing quaternary ammonium cations and halide ions as zwitterionic functional groups in the side chain thereof.

[Formula 2]

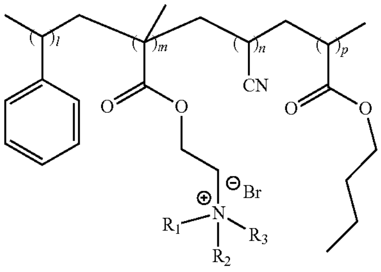

(In Formula 2, $R_1$, $R_2$, and $R_3$ are each independently hydrogen or alkyl having 1 to 9 carbon atoms, and l is in a range of 1 to 1500, m is in a range of 1 to 1500, n is in a range of 1 to 2000, and p is in a range of 0 to 1500.

A method of producing an air filter nanofiber made of a styrene-(meth)acrylate-acrylonitrile random copolymer having a zwitterionic functional group in the side chain according to the present disclosure includes: (a) preparing a styrene-(meth)acrylate-acrylonitrile random copolymer by polymerizing a styrene monomer, a (meth)acrylate monomer, and an acrylonitrile monomer; (b) introducing a zwitterionic functional group into the side chain of the styrene-(meth)acrylate-acrylonitrile random copolymer; and (c) preparing a nanofiber by electrospinning the resulting styrene-(meth)acrylate-acrylonitrile random copolymer having a zwitterionic functional group in the side chain.

For example, an air filter nanofiber made of an amphoteric random copolymer represented by Formula 1 is obtained by sequentially performing: (a) preparing a polystyrene-co-poly 2-(dimethylamino)ethylmethacrylate-co-poly(acrylonitrile) (ABC) random copolymer polymerizing a styrene monomer by polymerizing a 2-(dimethylamino)ethyl methacrylate monomer and an acrylonitrile monomer; (b) reacting the polystyrene-co-poly 2-(dimethylamino)ethyl methacrylate-co-polyacrylonitrile) random copolymer with 1,3-propanesultone to form a sulfobetaine group to be introduced in the side chain; and (c) electrospinning the polystyrene-co-poly 2-(dimethylamino)ethyl methacrylate-co-poly(acrylonitrile) (ABC) random copolymer having a sulfobetaine group in the side chain to produce nanofibers.

The nanofiber made of a styrene-(meth)acrylate-acrylonitrile random copolymer having a zwitterionic functional group in the side chain according to the present disclosure has a high dipole moment due to the zwitterionic functional group, thereby significantly facilitating the bonding of fine dust (particulate matter) to the polymer surface. Therefore, the nanofiber not only has high filtration efficiency (>99.9%) for particulate matter but also has low airflow resistance and excellent antibacterial properties. Due to these advantages, the nanofiber can be very usefully used as a core material of air purifier filters, vehicle air cleaner filters, and the like.

DETAILED DESCRIPTION

Figure 1:
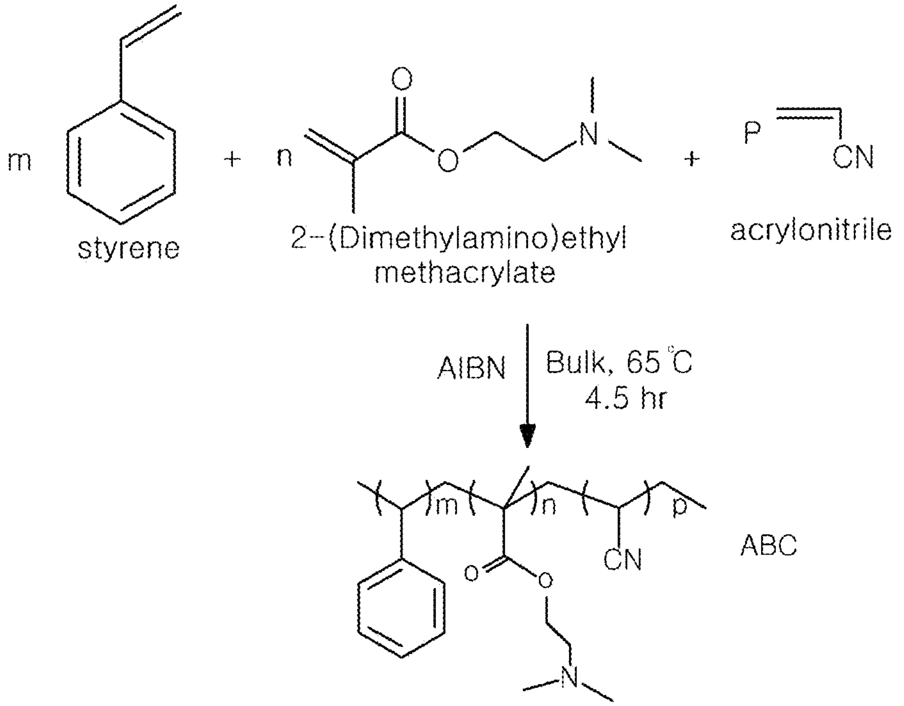
FIG. 1 is a synthesis reaction formula of a polystyrene-co-poly 2-(dimethylamino)ethyl methacrylate-co-poly(acrylonitrile) (ABC) random copolymer synthesized in an example disclosed in the present application.

Particulate matter (PM), which is one of the representative air pollutants, is fine particles that are not visible with the naked eye. The particulate matter is a substance that floats or flows in the air for a long time. The particulate matter is usually classified into PM10 (2.5 μm<particle size≤10 μm) called fine dust and PM2.5 (particle size≤2.5 μm) called ultrafine dust.

Various air filter membranes have been developed to effectively filter out such fine dust. Among them, fiber-based high-efficiency particulate air (HEPA) filters and ultra-low particulate air (ULPA) filters are known to collect fine dust with filtration efficiencies of 99.97% and 99.999%, respectively.

However, although these air filters have high filtration efficiency, clogging frequently occurs in a short time after starting of filtration due to a limited specific surface area, so that a very high pressure drop occurs in the air flow across the filter.

In describing the present disclosure, well-known functions or constructions will not be described in detail when it is determined that they may obscure the gist of the present disclosure.

Since embodiments in accordance with the concept of the present disclosure can undergo various changes and have various forms, only some specific embodiments are illustrated in the drawings and described in detail in the present specification. While specific embodiments of the present disclosure are described herein below, they are only for illustrative purposes and should not be construed as limiting to the present disclosure. Thus, the present disclosure should be construed to cover not only the specific embodiments but also cover all modifications, equivalents, and substitutions that fall within the concept and technical spirit of the present disclosure.

The terminology used herein is for the purpose of describing particular embodiments only and is not intended to limit the scope of the present disclosure. As used herein, the singular forms “a”, “an”, and “the” are intended to include the plural forms as well unless the context clearly indicates otherwise. It will be further understood that the terms “comprise” or “has” when used in the present specification specify the presence of stated features, regions, integers, steps, operations, elements and/or components, but do not preclude the presence or addition of one or more other features, regions, integers, steps, operations, elements, components and/or combinations thereof.

Hereinafter, the present disclosure will be described in detail. Examples disclosed in the present description can be modified into various other forms, and the scope of the present description is not construed as being limited to the examples described below. Examples are provided to more fully describe the present description to the ordinarily skilled in the art.

Hereinafter, the present disclosure will be described in detail with reference to examples.

EXAMPLE

1. Synthesis of Zwitterionic/Quaternary Ammonium Random Copolymers (Z-ABC, Q-ABC)

(1) Synthesis of polystyrene-Co-poly 2-(dimethylamino) ethyl methacrylate-co-poly(acrylonitrile) (ABC) Random Copolymer A typical free radical bulk polymerization was performed to synthesize an elastomeric polystyrene-co-poly 2-(dimethylamino)ethylmethacrylate-co-poly(acrylonitrile) (ABC) random copolymer according to a reaction formula shown in FIG. 1.

Styrene (0.955 mol, 99 g), acrylonitrile (0.955 mol, 57.7 g), and 2-(dimethylamino)ethylmethacrylate (1.91 mol, 300 g) were charged into a round bottom flask equipped (1 L) with an overhead mechanical stirrer such that the mole of 2-(dimethylamino)ethyl methacrylate monomer is twice that of each of styrene and acrylonitrile (i.e., the molar ratio of styrene:2-(dimethylamino)ethyl methacrylate:acrylonitrile is 25:50:25) in the polymer. The added substances were mixed in the flask, and the mixture was degassed with argon for 1 hour. After heating the contents of the flask to 65° C., AIBN (0.002 mol, 0.32 g) was added to initiate polymerization under inert conditions at the same temperature.

Figure 2:
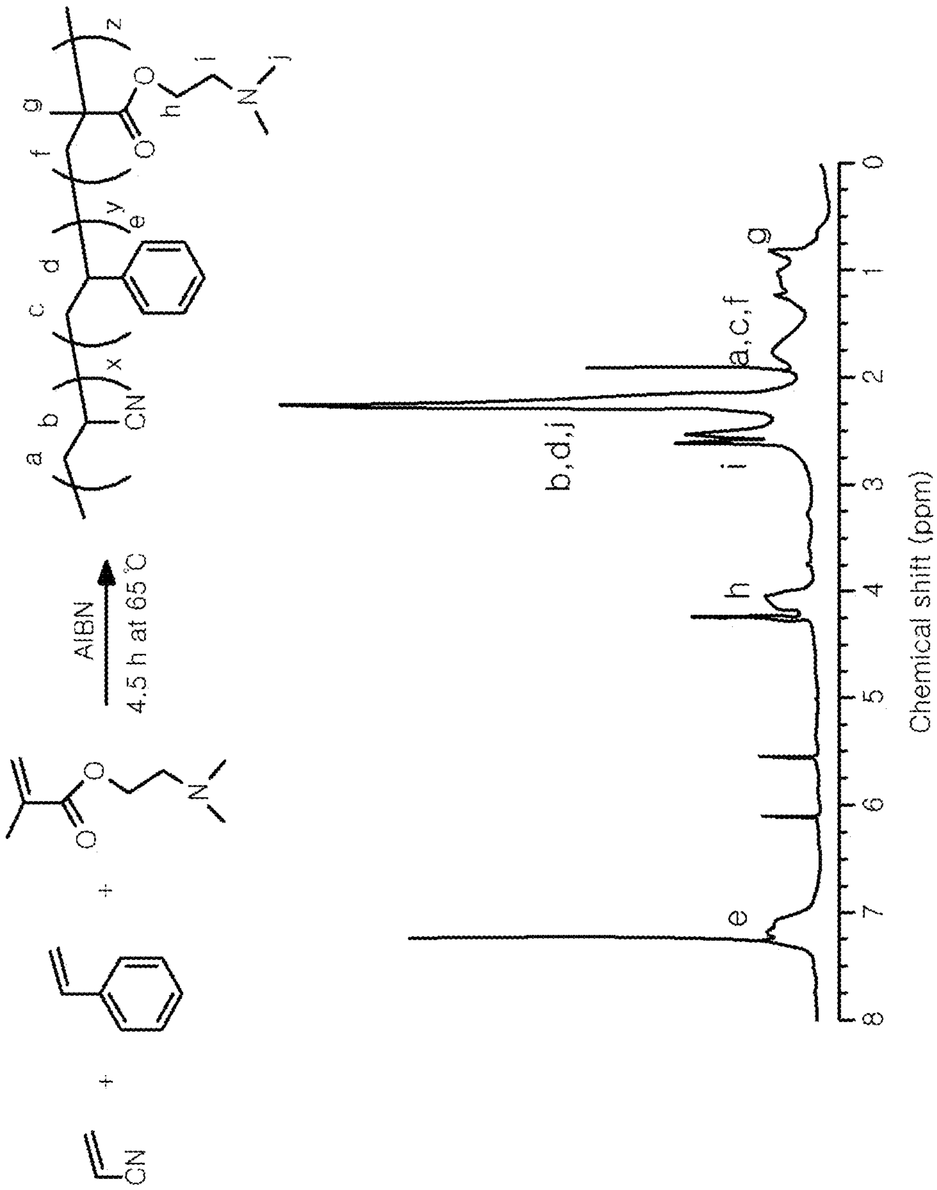
FIG. 2 is a $^1$H NMR spectrum of a polystyrene-co-poly 2-(dimethylamino)ethyl methacrylate-co-poly(acrylonitrile) (ABC) random copolymer synthesized in an example disclosed in the present application.

After 4.5 hours from the start of polymerization, the polymerization was terminated by exposing the contents to air. 200 ml of THF was added to the polymerization flask so that the contents of the flask was precipitated in a large amount of hexane. Thus, a sticky and rubbery polymer was obtained. The polymer was dried under vacuum at 60° C. for 24 hours. Thus, the polymer was obtained in a yield of 81%. On the basis of the $^1$H NMR result, it was confirmed from the ABC copolymer was successfully synthesized (see FIG. 2), and the number average molecular weight (Mn=158100) and dispersion degree (PDI=1.760) were calculated according to the SEC technique.

Figure 3:
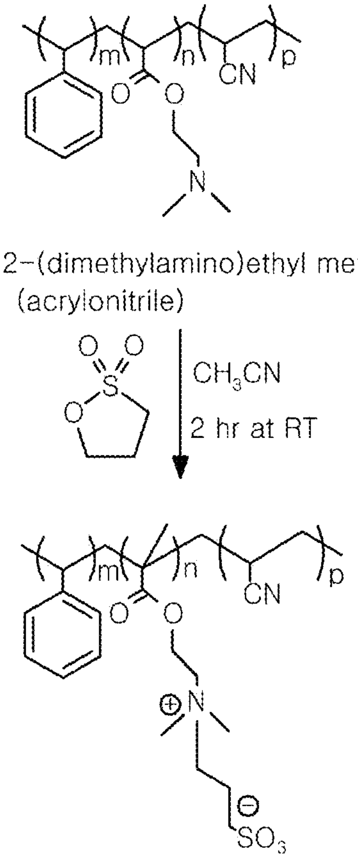
FIG. 3 is a synthesis reaction formula of a zwitterionic polystyrene-co-poly 2-(dimethylamino)ethyl methacrylate-co-poly (acrylonitrile) (Z-ABC) random copolymer synthesized in an example disclosed in the present application.

(2) Synthesis of Zwitterionic Elastomer (polystyrene-co-poly 2-(dimethylamino)ethyl methacrylate-co-poly(acrylonitrile) (Z-ABC) Random Copolymer To synthesize a zwitterionic polystyrene-co-poly 2-(dimethylamino)ethyl methacrylate-co-poly(acrylonitrile) (Z-ABC) random copolymer according to the reaction formula of FIG. 3, the ratio of dimethylamino groups present in the poly 2-(dimethylamino)ethyl methacrylate block of the ABC copolymer synthesized in section (1) was calculated by $^1$H NMR and the molecular weight of the ABC copolymer. When synthesizing 337.5 g of a 20% Z-ABC polymer having a 43% poly 2-(dimethylamino)ethylmethacrylate block, the total number of dimethylamino groups present in the ABC copolymer was calculated to be 2.16 moles.

Figure 4:
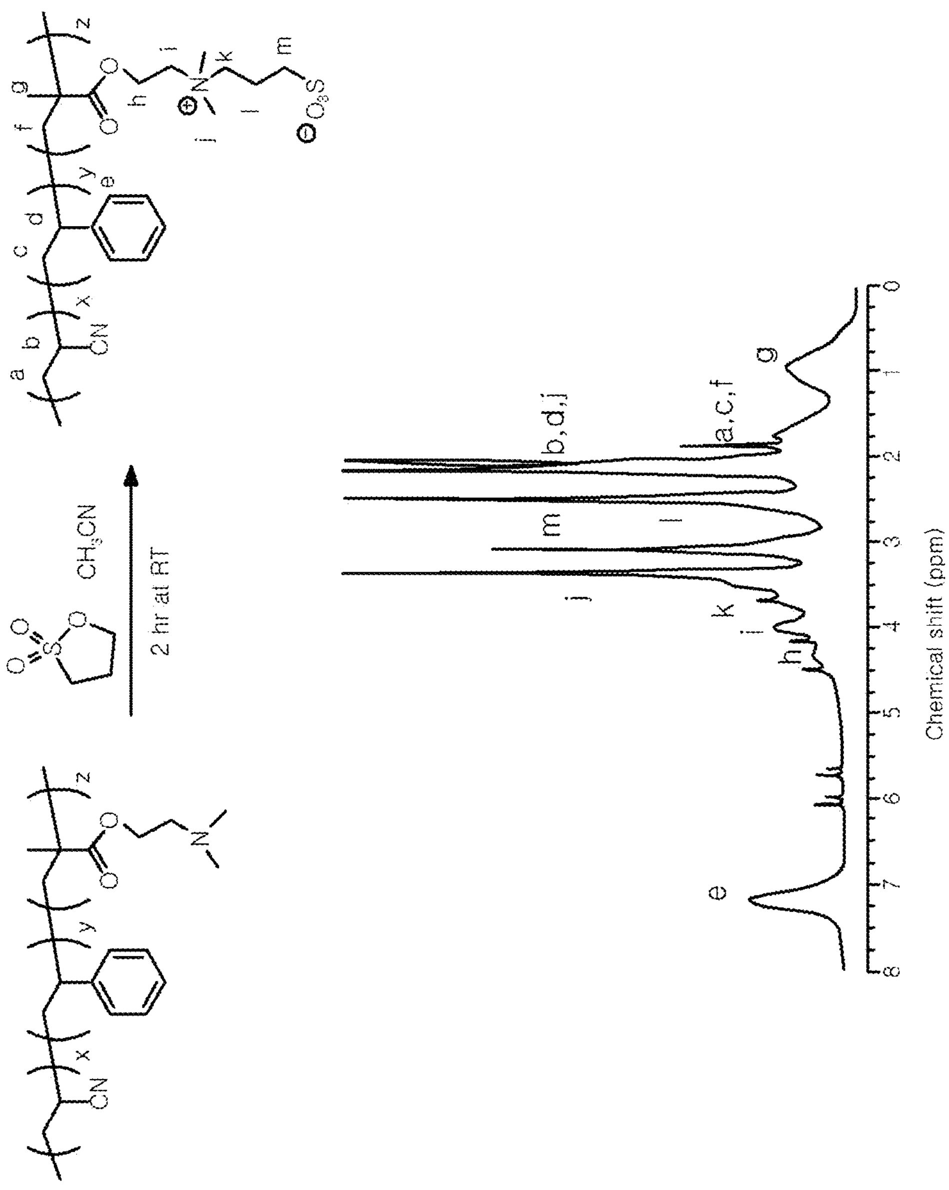
FIG. 4 is a $^1$H NMR spectrum of a zwitterionic polystyrene-co-poly 2-(dimethylamino)ethyl methacrylate-co-poly (acrylonitrile) (Z-ABC) random copolymer synthesized in an example disclosed in the present application.

337.5 g of the ABC copolymer was dissolved in 1500 ml of acetonitrile, 38 ml of 1,3-propanesultone (PS) was added dropwise to the solution under stirring for 1 hour, and the reaction was allowed to proceed for 2 hours. The dimethylamino)ethylmethacrylate groups were converted into zwitterionic N,N-dimethyl-N-methacryloxyethyl-N-(3-sulfopropyl) groups, and thus the product was obtained in 100% yield. The product was washed with acetone two or three times and finally dried under vacuum at 60° C. for one day. Through the $^1$H NMR spectrum, it was confirmed that the Z-ABC random copolymer was successfully synthesized (see FIG. 4).

Figure 5:
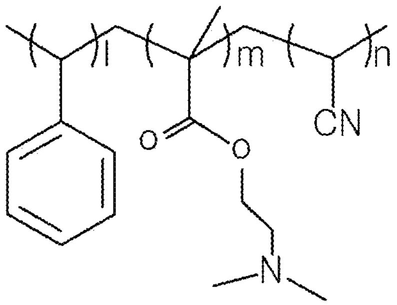
FIG. 5 is a synthesis reaction formula of a quaternary ammonium polystyrene-co-poly 2-(dimethylamino)ethyl methacrylate-co-poly(acrylonitrile) (Q-ABC) random copolymer synthesized in an example disclosed in the present application.
Figure 5:
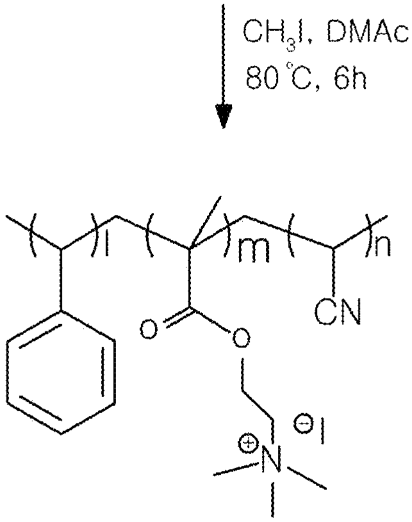

(3) Synthesis of Quaternary Ammonium Elastomer (polystyrene-co-poly 2-(dimethylamino)ethyl methacrylate-co-poly(acrylonitrile) (Q-ABC) Random Copolymer To synthesize a quaternary ammonium polystyrene-co-poly 2-(dimethylamino)ethyl methacrylate-co-poly(acrylonitrile) (Q-ABC) random copolymer according to the reaction formula of FIG. 5, the ratio of dimethylamino groups present in the poly 2-(dimethylamino)ethyl methacrylate block of the ABC copolymer synthesized in section (1) was calculated by $^1$H NMR and the molecular weight of the ABC copolymer. When synthesizing 337.5 g of a 60% Z-ABC polymer having a 43% poly 2-(dimethylamino) ethylmethacrylate block, the total number of dimethylamino groups present in the ABC copolymer was calculated to be 2.16 moles.

Figure 6:
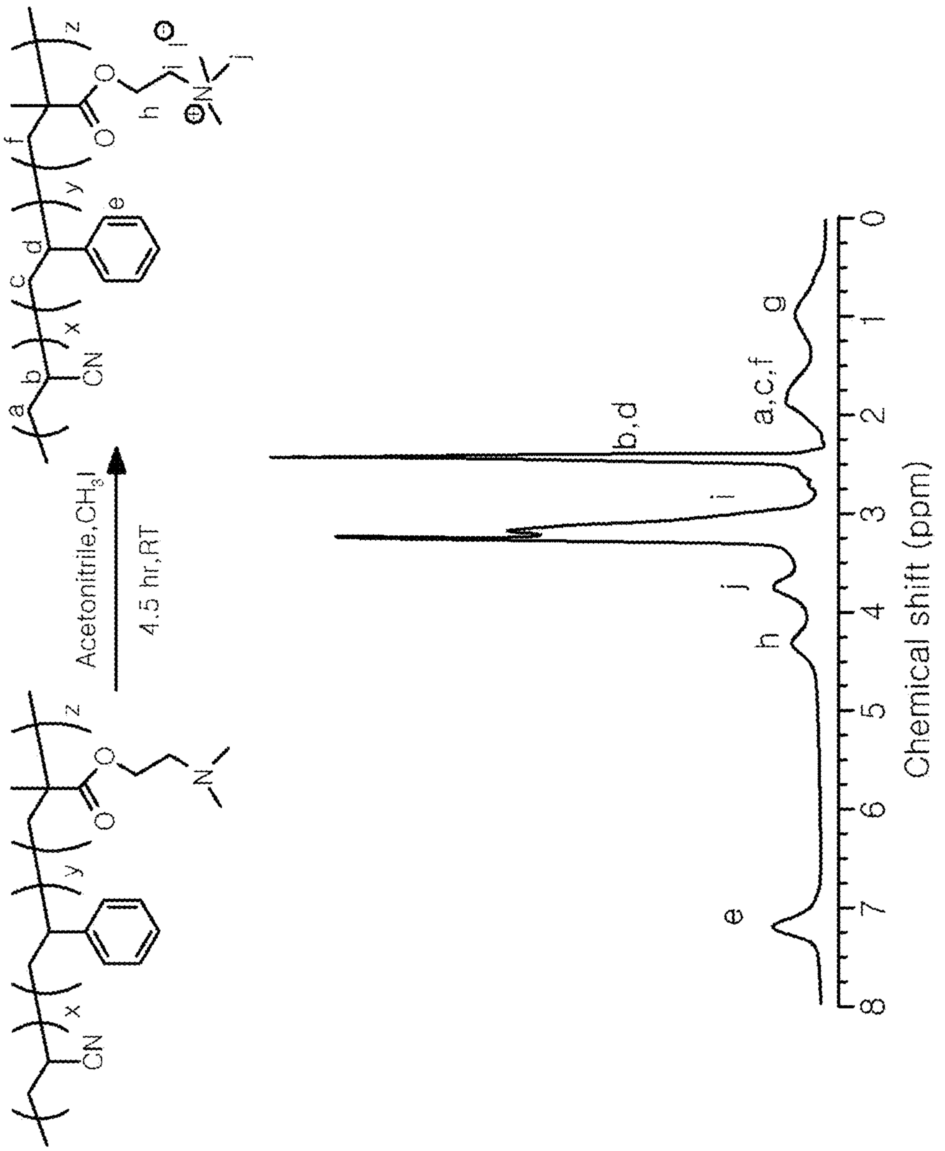
FIG. 6 is a $^1$H NMR spectrum of a quaternary ammonium polystyrene-co-poly 2-(dimethylamino)ethyl methacrylate-co-poly(acrylonitrile) (Q-ABC) random copolymer synthesized in an example disclosed in the present application.

337.5 g of the ABC copolymer was dissolved in 1500 ml of acetonitrile, 81 ml of methyl iodide ($CH_3I$) was added dropwise to the solution under stirring for 1.5 hours, and the reaction proceeded for 5 hours at room temperature under continuous stirring. The product was obtained in 94% yield while converting the 2-(dimethylamino)ethylmethacrylate groups to quaternary ammonium groups. The product was washed with isopropyl alcohol three times or four times and finally dried under vacuum at 65° C. for one day. Through the $^1$H NMR spectrum, it was confirmed that the Q-ABC random copolymer was successfully synthesized (see FIG. 6).

2. Preparation of Nanofibers Made of Zwitterionic Random Copolymers and Nanofiber Webs A polymer solution containing 25% by weight of the Z-ABC prepared in section 1 was electrospun in dimethylformamide under conditions of a needle gauge of 23 (inner diameter of 0.34 mm), a solution pumping speed of 6 mL/h, a voltage of 27 kV, and a spinning distance of 15 cm, and the electrospun nanofibers were collected in a drum collector rotating at 100 rpm. In this case, the chamber temperature and relative humidity (RH) were 25±2° C. and 55±5% RH, respectively.

Table 1 below shows the filtration comparison results of nanomembranes made of zwitterionic [polystyrene-co-poly 2-(dimethylamino)ethyl methacrylate-co-poly(acrylonitrile)] (Z-ABC) random copolymer nanofibers for NaCl PM with variable flow rates. As the flow rate of the 25% by weight of the polymer concentration increases from 0.5 ml/h to 2.5 ml/h, the higher the efficiency of the filter, the higher the filtration efficiency, and the thicker the filter, the higher the filtration efficiency and the pressure drop. From the fact described above, it is seen that the filtration efficiency and the pressure drop linearly increase.

TABLE 1

Filtration performance of air filters made of zwitterionic random copolymer (Z-ABC) nanofibers

| Polymer Flow Rate (ml/h) | Filter Efficiency (%) | Pressure Drop (mm $H_2O$) |
|---|---|---|
| 0.5 | 56.14261 | 2.1 |
| 1 | 80.86443 | 4.3 |
| 1.5 | 92.33213 | 7.2 |
| 2 | 96.14354 | 9.7 |
| 2.5 | 99.92188 | 18.1 |

Figure 7:
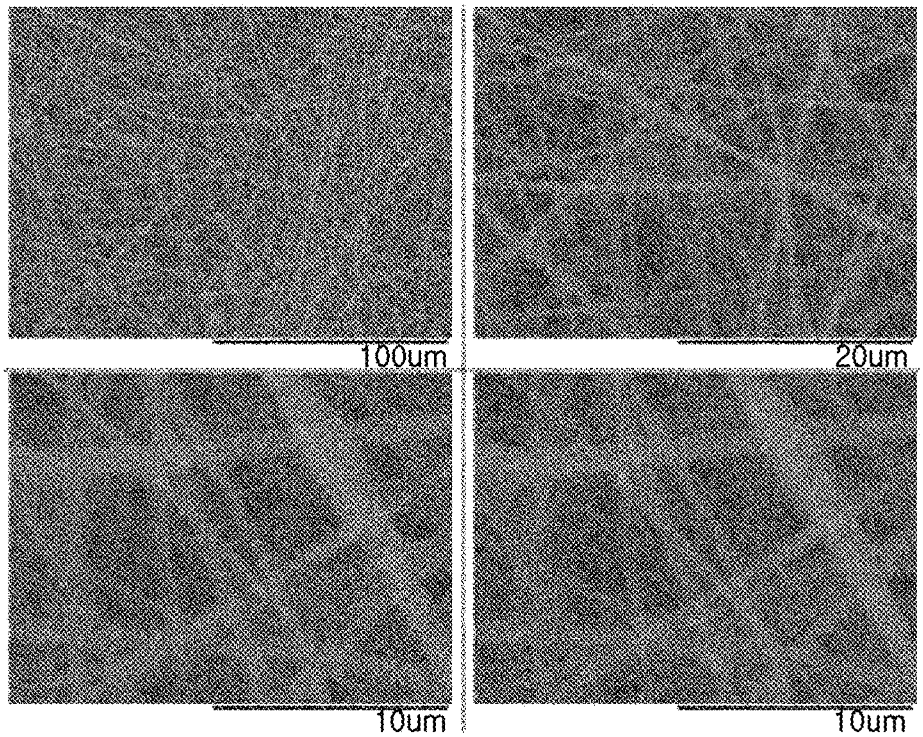
FIG. 7 is a scanning electron microscope (SEM) image of nanofibers (Z-ABC) prepared according to an example disclosed in the present application.
Figure 8:
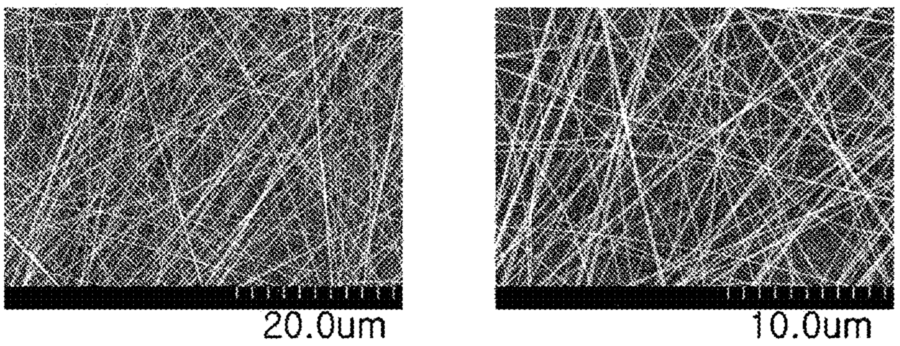
FIG. 8 is a scanning electron microscope (SEM) image of nanofibers (Q-ABC) prepared according to an example disclosed in the present application.

The prepared electrospun web had a basis weight of about 70 $g/m^2$, a total thickness of 435 μm, and a fiber diameter of less than 200 nm, as shown in the SEM image of FIG. 7. Due to the large surface area attributable to the small diameter, the probability of particle entrapment was significantly increased. The electrospun nanofiber filter has a very high surface-area-to-volume ratio and thus has a high surface cohesive force. Therefore, the nanofiber filter can easily trap small particles such as fine dust, resulting in improvement of filtration efficiency. In addition, the present disclosure took advantage of the fact that the polymer trapping efficiency increases as the dipole moment of the polymer repeating unit increases, and the polymer having a larger dipole moment has better PM particle removal efficiency. For reference, FIG. 8 shows the SEM image of nanofibers obtained by electrospinning a polymer solution containing the Q-ABC prepared in section 1.

Figure 9:
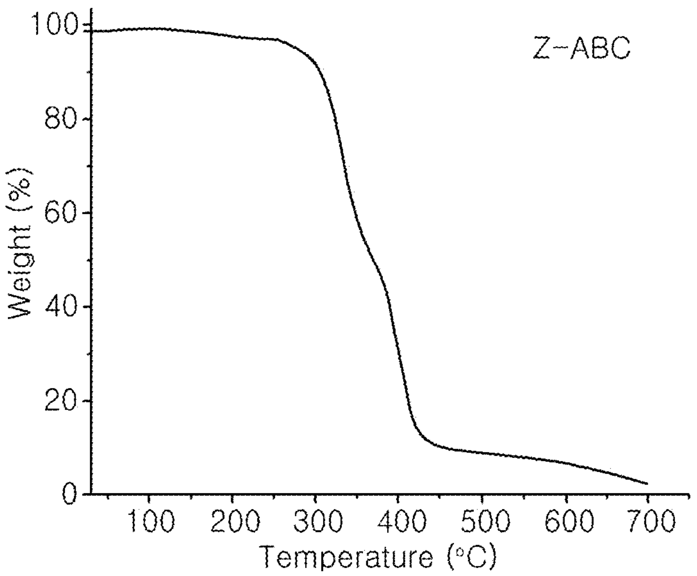
FIG. 9 is a result of a thermogravimetric analysis (TGA) of a zwitterionic polystyrene-co-poly 2-(dimethylamino) ethyl methacrylate-co-poly(acrylonitrile) (Z-ABC) random copolymer synthesized in an example disclosed in the present application.

The thermal stability of the Z-ABC random copolymer was determined using thermogravimetric analysis (TGA). According to FIG. 9 showing the TGA trace of the copolymer, a slight decrease in polymer weight was observed at about 200° C. According to prior research, it is known that the thermal decomposition of the quaternary ammonium-containing polymer follows the Hofmann elimination mechanism and begins to thermally decompose at about 300° C. A similar phenomenon was observed in the example disclosed in the present description.

In addition, the antibacterial properties of the nanowebs made of the zwitterionic random copolymer (Z-ABC) nanofibers prepared in the examples of the present application were evaluated by the FITI test laboratory as a bacteriostatic reduction rate according to the KS K 0693 standard.

That is, after culturing each of Staphylococcus aureus and pneumococcus in each of the culture medium itself ('BLANK') and the nanoweb ('#1') prepared in the example of the present application and containing the culture medium, for 18 hours, the number of viable cells for each strain was measured, and the antibacterial activity was evaluated with the bacteriostatic reduction rate. The results are shown in Table 2 below.

Referring to Table 2 below, it was confirmed that the nanoweb made of the zwitterionic random copolymer (Z-ABC) nanofibers according to the present disclosure has significantly excellent antibacterial properties to the extent that each of the Staphylococcus aureus and pneumoniae was removed by 99.9%.

TABLE 2

Result of Antibacterial Test (KS K 0693: 2016)

| | | BLANK | #1 |
|---|---|---|---|
| Strain 1 | Initial number of bacteria | $1.8 \times 10^4$ | $1.8 \times 10^4$ |
| | After 18 hours | $1.2 \times 10^7$ | $2.2 \times 10^3$ |
| | Bacteriostatic reduction rate | — | 99.9 |

TABLE 2-continued

Result of Antibacterial Test (KS K 0693: 2016)

| | | BLANK | #1 |
|---|---|---|---|
| Strain 2 | Initial number of bacteria | $1.8 \times 10^4$ | $1.8 \times 10^4$ |
| | After 18 hours | $4.2 \times 10^7$ | <10 |
| | Bacteriostatic reduction rate | — | 99.9 |

Note)
Standard cloth: cotton
Nonionic surfactant: TWEEN 80, 0.05% is added to an inoculation liquid
Test strain used: strain 1 - *Staphylococcus aureus* ATCC 6538
Strain 2 - *Klebsiella pneumoniae* ATCC 4352.
<= less than As described above, the electrospun nanofibers prepared according to the present disclosure exhibit high filtration efficiency (>99.9%) and exhibit low resistance to airflow by having a fiber diameter in the range of 150 to 200 nm. The nanomembrane made of the nanofibers according to the present disclosure exhibiting a synergistic effect of a small fiber diameter and a zwitterionic polar chemical functional group having a high dipole moment value on the outer surface of the fiber is an ideal material for efficiently trapping PM particles.

Furthermore, the nanofibers obtained through electrospinning according to the present disclosure have a high surface-area-to-volume ratio, low resistance to airflow, improved filtration performance, and excellent antibacterial properties, and thus the nanofibers can be used in various application fields such as air filtration, healthcare, and energy.

As described above, the present disclosure has been described based on examples and comparative examples, but the technical spirit of the present disclosure is not limited thereto. In addition, it will be apparent to those skilled in the art that modifications or changes can be made within the scope described in the claims in the technical field to which the present disclosure pertains, and such modifications and variations will fall within the scope of the appended claims.

The nanofiber made of a styrene-(meth)acrylate-acrylonitrile random copolymer having a zwitterionic functional group in the side chain thereof, according to the present disclosure has high filtration efficiency (>99.9%) for particulate matter (PM), low airflow resistance, and excellent antibacterial properties, thereby being very usefully used as a core material of air purifier filters, vehicle air cleaner filters, and the like.

What is claimed is:

1. An air filter nanofiber comprising a styrene-(meth)acrylate-acrylonitrile random copolymer having a zwitterionic functional group in a side chain thereof, wherein the styrene-(meth)acrylate-acrylonitrile random copolymer comprises polystyrene-co-poly 2-(dimethylamino)ethyl methacrylate-co-poly(acrylonitrile).

2. The air filter nanofiber of claim 1, wherein the nanofiber has a fiber diameter of 150 nm to 200 nm.

* * * * *